US009885398B2

(12) United States Patent
Mochizuki et al.

(10) Patent No.: US 9,885,398 B2
(45) Date of Patent: Feb. 6, 2018

(54) SHOCK ABSORBER (71) Applicant: KYB Corporation, Tokyo (JP)

(72) Inventors: Takahisa Mochizuki, Gifu (JP); Naoki Ito, Gifu (JP)

(73) Assignee: KYB Corporation, Tokyo (JP)

( * ) Notice: Subject to any disclaimer, the term of this patent is extended or adjusted under 35 U.S.C. 154(b) by 0 days.

(21) Appl. No.: 15/100,522

(22) PCT Filed: Dec. 9, 2014

(86) PCT No.: PCT/JP2014/082526
§ 371 (c)(1),
(2) Date: May 31, 2016

(87) PCT Pub. No.: WO2015/093343
PCT Pub. Date: Jun. 25, 2015

(65) Prior Publication Data
US 2016/0298713 A1    Oct. 13, 2016

(30) Foreign Application Priority Data

Dec. 20, 2013  (JP) .................. 2013-263150

(51) Int. Cl.
*F16F 9/096*  (2006.01)
*F16F 9/32*  (2006.01)
(Continued)

(52) U.S. Cl.
CPC .............. *F16F 9/096* (2013.01); *F16F 9/187* (2013.01); *F16F 9/3242* (2013.01);
(Continued)

(58) Field of Classification Search
CPC .... F16F 9/066; F16F 9/18; F16F 9/187; F16F 9/3242; F16F 9/3257
(Continued)

(56) References Cited

U.S. PATENT DOCUMENTS 4,061,320 A * 12/1977 Warner ..................... F16F 9/42
188/314
4,732,244 A *  3/1988 Verkuylen ............... F16F 9/446
137/493.8

(Continued)

FOREIGN PATENT DOCUMENTS

EP    2103835 A1    9/2009
EP    2746616 A2    6/2014
(Continued)

*Primary Examiner* — Thomas J Williams
(74) *Attorney, Agent, or Firm* — Rabin & Berdo, P.C.

(57) ABSTRACT

A shock absorber includes a vessel externally mounted to the outer tube, a reservoir provided inside the vessel to communicate with the bottom chamber, a discharge passage that allows the rod-side chamber to communicate with the reservoir, and a damping valve provided in the middle of the discharge passage, wherein the discharge passage has a connecting member that connects the vessel and the outer tube, a cylindrical gap provided between the outer tube and the cylinder, an installation hole provided in the outer tube and opened to the cylindrical gap, a first bottom passage that has one end communicating with the bottom chamber and the other end connected to one end of the connecting member, and a second bottom passage that has one end communicating with the installation hole and the other end communicating with the middle of the first bottom passage, and the damping valve is installed in the installation hole.

5 Claims, 6 Drawing Sheets (51) Int. Cl.
*F16F 9/18* (2006.01)
*B62K 25/04* (2006.01)

(52) U.S. Cl.
CPC ............ *F16F 9/3257* (2013.01); *B62K 25/04* (2013.01); *B62K 2025/045* (2013.01); *F16F 2230/00* (2013.01); *F16F 2230/0005* (2013.01)

(58) Field of Classification Search
USPC .................................. 188/266.5, 266.6, 314
See application file for complete search history.

(56) References Cited

U.S. PATENT DOCUMENTS

| | | | | |
|---|---|---|---|---|
| 5,472,070 | A * | 12/1995 | Feigel | F16F 9/46 188/266.6 |
| 7,950,506 | B2 * | 5/2011 | Nowaczyk | F16F 9/466 188/266.6 |
| 2003/0137122 | A1 * | 7/2003 | Tantius | B60G 15/02 280/124.155 |
| 2005/0061591 | A1 * | 3/2005 | Deferme | F16F 9/062 188/280 |
| 2008/0265476 | A1 | 10/2008 | Beck | |
| 2011/0057370 | A1 * | 3/2011 | Kamioka | F16F 9/096 267/217 |
| 2016/0319897 | A1 * | 11/2016 | Mochizuki | F16F 9/096 |

FOREIGN PATENT DOCUMENTS

| | | | | |
|---|---|---|---|---|
| EP | 2952419 A2 * | 12/2015 | ........... | B62D 33/068 |
| GB | 493157 A | 10/1938 | | |
| GB | 2262971 A * | 7/1993 | ............. | F16F 9/062 |
| JP | 50-99007 U | 8/1975 | | |
| JP | 2008039116 A * | 2/2008 | ............. | B62K 25/08 |
| JP | 2009-222136 A | 10/2009 | | |
| WO | WO 03095248 A1 * | 11/2003 | ............. | F16F 9/096 |

* cited by examiner

SHOCK ABSORBER

TECHNICAL FIELD

This invention relates to a shock absorber.

BACKGROUND ART

As a sort of shock absorbers, a uni-flow type shock absorber is known in the art. For example, JP 2009-222136 A discloses a triple-tube structure uni-flow type shock absorber including an outer tube having a bottomed tubular shape, a cylindrical intermediate tube provided in an axial center portion of the outer tube in an upright manner, and a cylinder provided in an axial center portion of the intermediate tube in an upright manner.

The shock absorber includes a piston rod that accesses the cylinder, a piston held in a leading end portion of the piston rod and inserted movably along an axial direction inside the cylinder, and a base member fixed to the side of the cylinder opposite to the piston rod.

The inside of the cylinder is partitioned by the piston into a rod-side chamber and a piston-side chamber. A bottom chamber is provided between a bottom portion of the outer tube and the base member. A reservoir is provided in a cylindrical gap between the intermediate tube and the outer tube. The rod-side chamber, the piston-side chamber, and the bottom chamber are filled with working oil, while the reservoir is encapsulated with working oil and gas.

The piston is provided with a piston passage that allows only for a flow of the working oil directed from the piston-side chamber to the rod-side chamber. In addition, the base member is provided with an absorption passage that allows only for a flow of the working oil directed from the bottom chamber to the piston-side chamber.

The rod-side chamber communicates with the reservoir via a discharge passage including a through-hole formed in the cylinder and the cylindrical gap formed between the cylinder and the intermediate tube. The reservoir communicates with the bottom chamber via a notch formed in the base member. In addition, a damping valve for exerting resistance to the flow of the working oil passing through the discharge passage is provided in the middle of the discharge passage.

In this configuration, during both expansion and contraction operations of the shock absorber, the working oil moves to the reservoir via the same discharge passage. As a result, the shock absorber generates a damping force caused by resistance of the same damping valve during both the expansion and contraction operations.

SUMMARY OF INVENTION

When the shock absorber has a triple-tube structure including a cylinder, an intermediate tube, and an outer tube as described above, its structure becomes complicated. In this regard, it is conceived that the shock absorber may be converted into a twin-tube structure by removing the intermediate tube, the vessel may be externally mounted to the outer tube, and the reservoir may be provided inside the vessel.

However, in this case, in order to provide the outer tube with a passage for causing the cylindrical gap and the reservoir to communicate with each other and a passage for causing the bottom chamber and the reservoir to communicate with each other, the structures of such passages may become complicated.

The present invention has an object to provide a uni-flow type shock absorber capable of simplifying a passage structure even when the vessel is externally mounted in the outer tube, and the passage for causing the cylindrical gap and the reservoir to communicate with each other and the passage for causing the bottom chamber and the reservoir to communicate with each other are provided in the outer tube.

According to one aspect of the present invention, a shock absorber includes an outer tube that has a bottomed tubular shape, a tubular cylinder provided in an axial center portion of the outer tube in an upright manner, a piston rod that accesses the cylinder, a piston held by a leading end portion of the piston rod and inserted into the cylinder movably along an axial direction, a base member fixed to a side of the cylinder opposite to the piston rod, a rod-side chamber and a piston-side chamber partitioned by the piston inside the cylinder and filled with a hydraulic fluid, a bottom chamber provided between a bottom portion of the outer tube and the base member and filled with a hydraulic fluid, a vessel externally mounted to the outer tube, a reservoir provided inside the vessel, the reservoir communicating with the bottom chamber and storing a hydraulic fluid, a piston passage that allows only for a flow of the hydraulic fluid directed from the piston-side chamber to the rod-side chamber, an absorption passage that allows only for a flow of the hydraulic fluid directed from the bottom chamber to the piston-side chamber, a discharge passage that allows the rod-side chamber to communicate with the reservoir, and a damping valve provided in the middle of the discharge passage, wherein the discharge passage has a connecting member that connects the vessel and the outer tube, a cylindrical gap provided between the outer tube and the cylinder, an installation hole provided in the outer tube and opened to the cylindrical gap, a first bottom passage that has one end communicating with the bottom chamber and the other end connected to one end of the connecting member, and a second bottom passage that has one end communicating with the installation hole and the other end communicating with the middle of the first bottom passage, and the damping valve is installed in the installation hole.

DESCRIPTION OF EMBODIMENTS

A description will now be made for a shock absorber 100 according to an embodiment of this invention with reference to the accompanying drawings. Note that like reference numerals denote like elements throughout some of the drawings.

Figure 7:
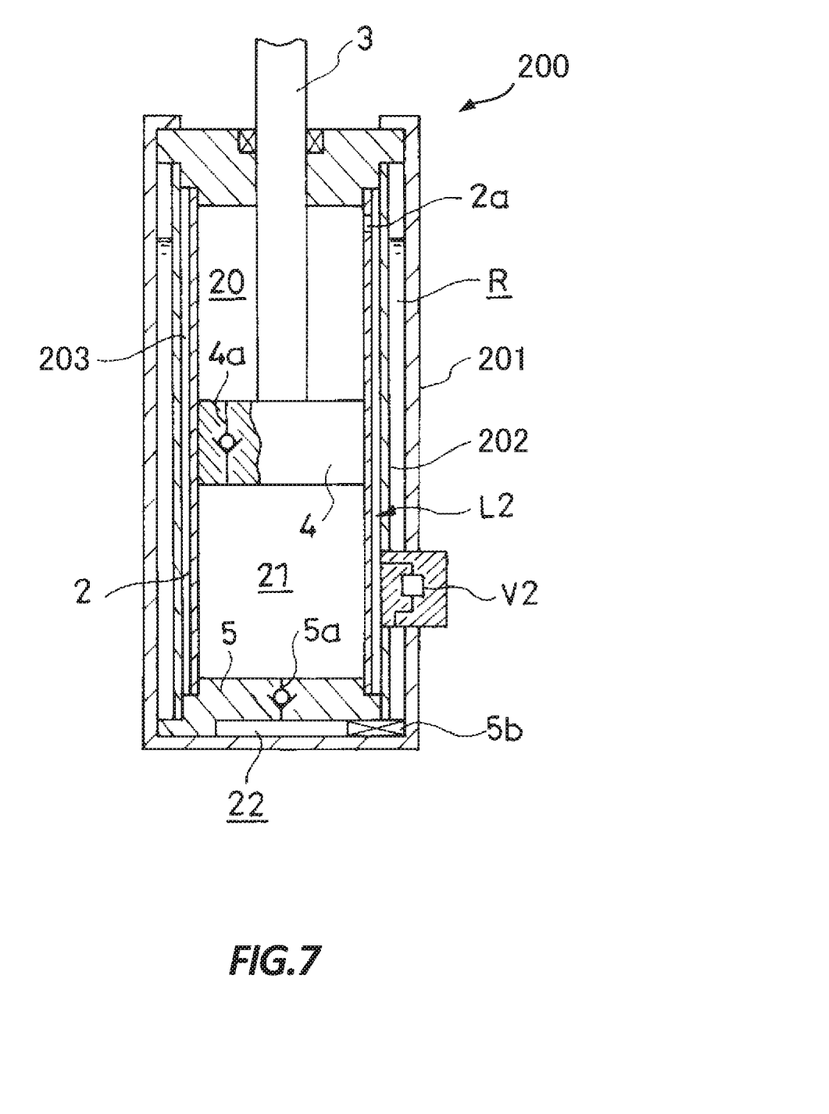
FIG. 7 is a schematic diagram illustrating a shock absorber according to a comparative example.

First, a description will be made for a shock absorber 200 according to a comparative example with reference to FIG. 7.

The shock absorber 200 is a triple-tube structure uni-flow type shock absorber including an outer tube 201 having a bottomed tubular shape, a cylindrical intermediate tube 202 provided in an axial center portion of the outer tube 201 in an upright manner, and a cylinder 2 provided in an axial center portion of the intermediate tube 202 in an upright manner.

The shock absorber 200 includes a piston rod 3 that accesses the cylinder 2, a piston 4 held in a leading end portion of the piston rod 3 and inserted into the cylinder 2 movably along an axial direction, and a base member 5 fixed to the side of the cylinder 2 opposite to the piston rod.

The inside of the cylinder 2 is partitioned by the piston 4 into a rod-side chamber 20 and a piston-side chamber 21. A bottom chamber 22 is provided between the bottom portion of the outer tube 201 and the base member 5. A reservoir R is provided in a cylindrical gap 203 between the intermediate tube 202 and the outer tube 201. The rod-side chamber 20, the piston-side chamber 21, and the bottom chamber 22 are filled with working oil, and the reservoir R is encapsulated with working oil and gas.

The piston 4 is provided with a piston passage 4a that allows only for a flow of the working oil directed from the piston-side chamber 21 to the rod-side chamber 20. In addition, the base member 5 is provided with an absorption passage 5a that allows only for a flow of the working oil directed from the bottom chamber 22 to the piston-side chamber 21.

The rod-side chamber 20 communicates with the reservoir R via a discharge passage L2 including a through-hole 2a formed in the cylinder 2 and a cylindrical gap 203 formed between the cylinder 2 and the intermediate tube 202. The reservoir R communicates with a bottom chamber 22 via a notch 5b formed in the base member 5. In addition, a damping valve V2 that exerts resistance to a flow of the working oil passing through the discharge passage L2 is provided in the middle of the discharge passage L2.

During an expansion operation of the shock absorber 200, the working oil of the contracting rod-side chamber 20 moves to the reservoir R via the discharge passage L2. In addition, the working oil corresponding to the volume of the piston rod 3 retreating from the cylinder 2 moves from the reservoir R to the bottom chamber 22 and further moves from the bottom chamber 22 to the expanding piston-side chamber 21 via the absorption passage 5a.

During a contraction operation of the shock absorber 200, the working oil of the contracting piston-side chamber 21 moves to the expanding rod-side chamber 20 via the piston passage 4a. In addition, the working oil corresponding to the volume of the piston rod 3 entering the cylinder 2 is discharged to the reservoir R via the discharge passage L2.

In this configuration, in both the expansion and contraction operations of the shock absorber 200, the working oil moves to the reservoir R via the discharge passage L2. Therefore, the shock absorber 200 can generate a damping force caused by the resistance of the damping valve V2 in both the expansion and contraction sides.

However, the triple-tube structure shock absorber having the cylinder, the intermediate tube, and the outer tube as in the shock absorber 200 has a completed structure. In this regard, it is conceived that the shock absorber may be converted into a twin-tube structure by removing the intermediate tube, the vessel may be externally mounted to the outer tube, and the reservoir may be provided inside the vessel.

However, in this case, in order to provide the outer tube with a passage that causes the cylindrical gap and the reservoir to communicate with each other and a passage that causes the bottom chamber and the reservoir to communicate with each other, the structures of such passages may become complicated.

Figure 1:
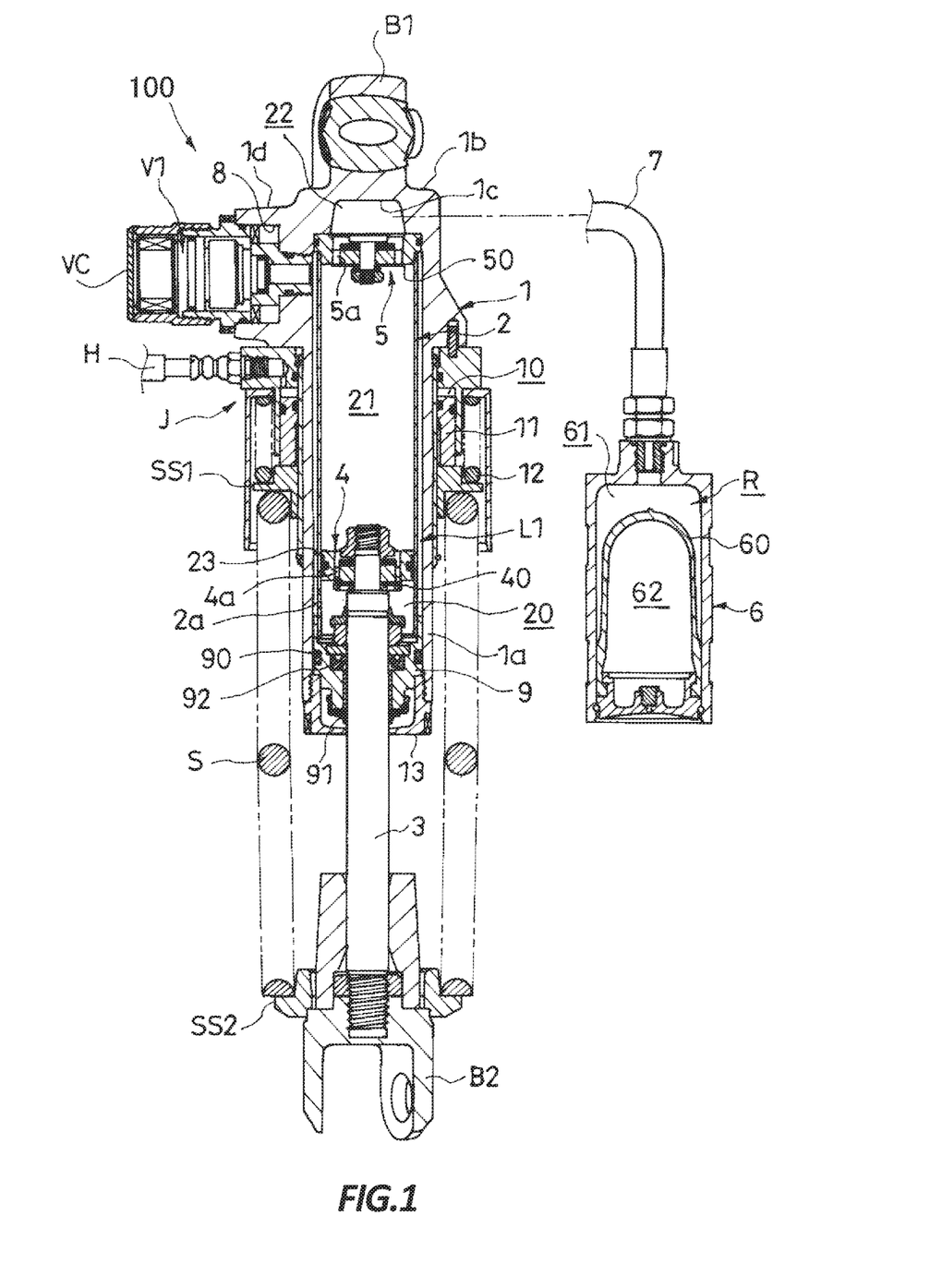
FIG. 1 is a cross-sectional view illustrating a shock absorber according to an embodiment of this invention.
Figure 2:
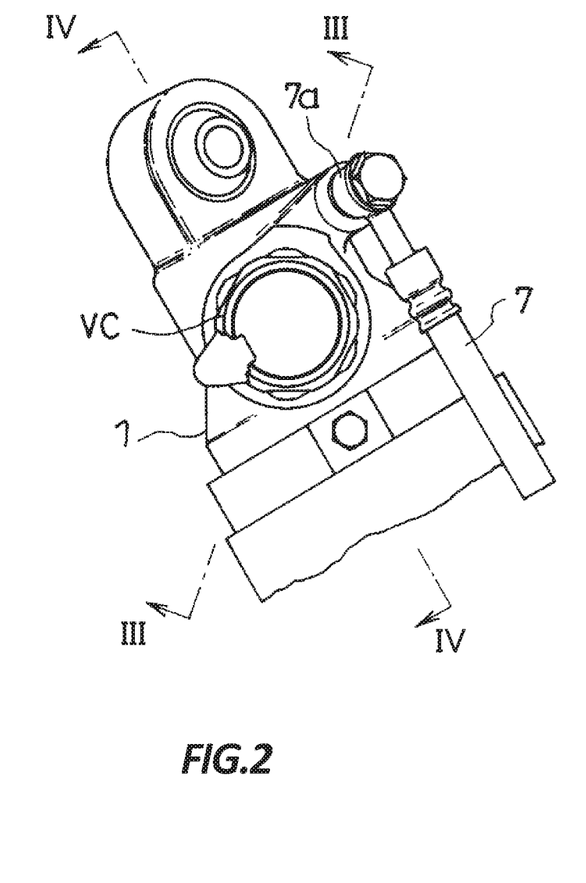
FIG. 2 is a perspective view illustrating an upper part of the shock absorber according to an embodiment of this invention.

In this regard, as illustrated in FIG. 1, a shock absorber 100 according to an embodiment of this invention comprises an outer tube 1 having a bottomed tubular shape, a tubular cylinder 2 provided in an axial center portion of the outer tube 1 in an upright manner, a piston rod 3 that accesses the cylinder 2, a piston 4 held in a leading end portion of the piston rod 3 and inserted into the cylinder 2 movably along an axial direction, a base member 5 fixed to the side of the cylinder 2 opposite to the piston rod 3, a rod-side chamber 20 and a piston-side chamber 21 partitioned by the piston 4 inside the cylinder 2 and filled with working oil, a bottom chamber 22 provided between the bottom portion 1b of the outer tube 1 and the base member 5 and filled with the working oil, a reservoir R provided outside the cylinder 2 to communicate with the bottom chamber 22 and store the working oil, a piston passage 4a that allows only for a flow of the working oil directed from the piston-side chamber 21 to the rod-side chamber 20, an absorption passage 5a that allows only for a flow of the working oil directed from the bottom chamber 22 to the piston-side chamber 21, a discharge passage L1 that causes the rod-side chamber 20 and the reservoir R to communicate with each other, and a damping valve V1 provided in the middle of the discharge passage L1.

Figure 3:
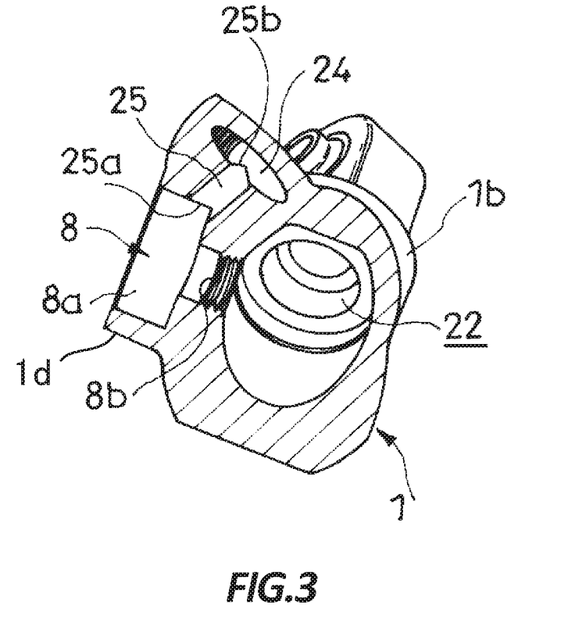
FIG. 3 is a cross-sectional view taken along a line III-III of FIG. 2.

The shock absorber 100 further includes a vessel 6 externally mounted to the outer tube 1 and internally provided with a reservoir R, a connecting member 7 that connects the vessel 6 and the outer tube 1, a cylindrical gap 23 provided between the outer tube 1 and the cylinder 2, an installation hole 8 provided in the outer tube 1 and opened to the cylindrical gap 23 so as to allow the damping valve V1 to be installed, a first bottom passage 24 having one end communicating with the bottom chamber 22 and the other end connected to one end of the connecting member 7 (refer to FIG. 3), and a second bottom passage 25 having one end 25a communicating with the installation hole 8 and the other end 25b communicating with the middle of the first bottom passage 24 (refer to FIG. 3).

The discharge passage L1 communicates with the reservoir R via the cylindrical gap 23, the installation hole 8, the second bottom passage 25, the first bottom passage 24, and the connecting member 7.

The shock absorber 100 is used in a rear cushion as a suspension of a rear wheel of a saddle-ride type vehicle such as a bicycle or tricycle.

According to this embodiment, the rear cushion includes a shock absorber 100, a suspension spring S provided in an outer circumference of the shock absorber 100, a pair of upper and lower spring bearings SS1 and SS2 that support the end portions of the suspension spring S, and a jack mechanism J for adjusting a vehicle height.

The suspension spring S is a coil spring that biases the shock absorber 100 in an expanding direction and elastically supports a vehicle chassis to absorb an impact caused by an uneven road surface.

The jack mechanism J includes a jack chamber 10 filled with an incompressible hydraulic fluid, a vertically movable jack piston 11 that closes a lower opening of the jack chamber 10 and supports the upper spring bearing SS1, a pump (not shown) connected to the jack chamber 10 via a hose H, and an auxiliary spring 12 that biases the spring bearing SS1 toward the suspension spring side.

The jack mechanism J adjusts the vehicle height by supplying or discharging the working oil to or from the jack chamber 10 using a pump and lifting or lowering the spring bearing SS1 using the jack piston 11. According to this embodiment, since the spring bearing SS1 is also supported by the auxiliary spring 12, the hydraulic fluid can be easily supplied to the jack chamber 10.

A configuration of the rear cushion may change appropriately, and, for example, the jack mechanism J may be removed. In addition, the shock absorber 100 may be used in a variety of purposes other than the rear cushion.

The shock absorber 100 includes an outer tube 1 formed in a bottomed tubular shape and arranged such that a bottom portion 1b faces upwards, a tubular cylinder 2 provided in an axial center portion of the outer tube 1 in an upright manner, a base member 5 interposed and fixed between an upper end of the cylinder 2 and a bottom portion 1b of the outer tube 1, an annular cap 13 screwed to an end portion of the lower opening of the outer tube 1, an annular rod guide 9 retained by the cap 13 and fixed to the lower opening of the cylinder 2, a piston rod 3 that accesses the cylinder 2 while being supported by the rod guide 9, a piston 4 held by an upper end (leading end) of the piston rod 3 and inserted into the cylinder 2 movably along an axial direction, an annular seal ring 90 that seals a gap between the rod guide 9 and the outer tube 1, an annular dust seal 91 and an oil seal 92 that seal a gap between the rod guide 9 and the piston rod 3, a vessel 6 provided outside the outer tube 1 and fixed to a vehicle chassis, and a connecting member 7 that connects the vessel 6 and the outer tube 1.

Installation members B1 and B2 are fixed to the upper end of the outer tube 1 and the lower end of the piston rod 3, respectively. The installation member B1 is connected to a chassis frame serving as a frame of the vehicle chassis. The installation member B2 is connected to a swing arm that supports the rear wheel. As a result, as an impact caused by an uneven road surface is input to the rear wheel, the piston rod 3 accesses the cylinder 2 so that the shock absorber 100 expands or contracts.

The shock absorber 100 according to this embodiment is an inverted type in which the cylinder 2 is connected to the vehicle chassis side, and the piston rod 3 is connected to the vehicle wheel side. However, the shock absorber 100 may be an upright type in which the cylinder 2 is connected to the vehicle wheel side, and the piston rod 3 is connected to the vehicle chassis side.

The outer tube 1 is internally provided with a rod-side chamber 20 and a piston-side chamber 21 partitioned by the piston 4 inside the cylinder 2, a bottom chamber 22 provided between a hollow 1c formed in the bottom portion 1b of the outer tube 1 and the base member 5, and a cylindrical gap 23 provided in the outer circumference of the cylinder 2. The rod-side chamber 20, the piston-side chamber 21, the bottom chamber 22, and the cylindrical gap 23 are filled with the working oil.

The vessel 6 externally mounted to the outer tube 1 is internally provided with a reservoir R. The reservoir R is partitioned by a partitioning wall member 61 provided in the vessel 6 into a fluid retaining chamber 61 and a gas chamber 62.

A state that the vessel 6 is externally mounted to the outer tube 1 refers to a state that the vessel 6 is not housed in the outer tube 1 nor the outer tube 1 is not housed in the vessel 6, while the vessel 6 is arranged outside the outer tube 1 and the outer tube 1 is arranged outside the vessel 6.

According to this embodiment, the vessel 6 is connected to the outer tube 1 using a connecting member 7 such as a hose or a pipe internally provided with a passage (not shown), and the fluid retaining chamber 61 and the bottom chamber 22 communicate with each other via the passage of the connecting member 7.

It is noted that, if the vessel 6 is externally mounted to the outer tube 1, the outer tube 1 and the vessel 6 may be formed integrally. In this case, a joining portion between the vessel 6 and the outer tube 1 corresponds to the connecting member, and a passage for causing the fluid retaining chamber 61 and a first bottom passage 24 (refer to FIG. 3) described below to communicate with each other may be provided in this joining portion.

According to this embodiment, the partitioning wall member 60 is an elastically deformable bladder that partitions the reservoir R into the fluid retaining chamber 61 and the gas chamber 62. In addition, the partitioning wall member 60 can be used to change a volume ratio between the fluid retaining chamber 61 and the gas chamber 62.

The fluid retaining chamber 61 is filled with the working oil. In addition, the gas chamber 62 is encapsulated with gas in a compressed state. It is noted that, although the working oil is used as a hydraulic fluid in this embodiment, any liquid capable of exerting a damping force may be used as a hydraulic fluid instead of the working oil.

Similarly, although the air is used as the gas in this embodiment, an inert gas such as nitrogen may also be used. In addition, any element other than the bladder may also be used as the partitioning wall member 60 if it can change the volume ratio between the fluid retaining chamber 61 and the gas chamber 62 while it partitions the reservoir R into the fluid retaining chamber 61 and the gas chamber 62. For example, the partitioning wall member 60 may be a free piston or a bellows.

The rod-side chamber 20 and the piston-side chamber 21 communicate with each other via the piston passage 4a provided in the piston 4. The piston passage 4a is provided with a check valve 40. As a result, the piston passage 4a allows only for a flow of the working oil directed from the piston-side chamber 21 to the rod-side chamber 20 and does not allow for the reverse flow.

The piston-side chamber 21 and the bottom chamber 22 communicate with each other via the absorption passage 5a provided in the base member 5. The absorption passage 5a is provided with a check valve 50. As a result, the absorption passage 5a allows only for a flow of the working oil directed from the bottom chamber 22 to the piston-side chamber 21 and does not allow for the reverse flow.

As illustrated in FIG. 3, the bottom chamber 22 is connected to one end of the first bottom passage 24 provided in the bottom portion 1b of the outer tube 1. Female threading is performed for the other end of the first bottom passage 24 where a connecting port 7a of the connecting member 7 is screwed. For this reason, the bottom chamber 22 and the reservoir R communicate with each other via the first bottom passage 24 and the connecting member 7.

As illustrated in FIG. 1, the rod-side chamber 20 communicates with the cylindrical gap 23 via a through-hole 2a provided in the lower side of the cylinder 2. In addition, the cylindrical gap 23 is provided with an installation portion 8 opened in a boundary between the bottom portion 1b and the tubular portion 1a of the outer tube 1 along a radial direction.

As illustrated in FIG. 3, the installation portion 8 is connected to one end 25a of the second bottom passage 25 provided in the bottom portion 1b of the outer tube 1. The other end 25b of the second bottom passage 25 is connected to the middle of the first bottom passage 24.

That is, according to this embodiment, the discharge passage L1 that causes the rod-side chamber 20 and the reservoir R to communicate with each other includes the through-hole 2a, the cylindrical gap 23, the installation hole 8, the second bottom passage 25, the first bottom passage 24, and the passage of the connecting member 7. Furthermore, the installation hole 8 is installed with the damping valve V1 that exerts resistance to a flow of the working oil passing through the discharge passage L1.

Figure 5:
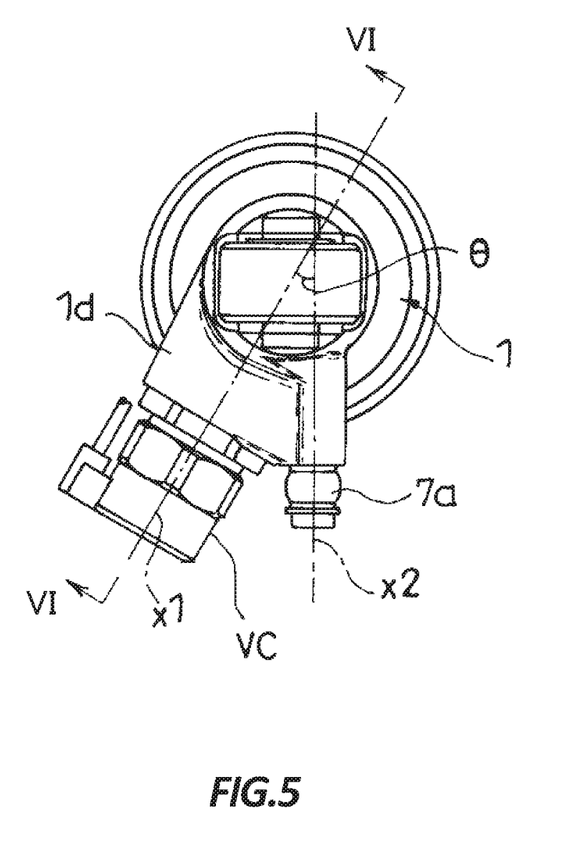
FIG. 5 is a plan view illustrating a shock absorber according to an embodiment of this invention.

Each of the installation hole 8 and the first bottom passage 24 is provided in a thick portion 1d formed in the upper side of the outer tube 1 to protrude outwards approximately perpendicularly to an axial center line of the tubular portion 1a of the outer tube 1. In addition, as illustrated in FIG. 5, the installation hole 8 and the first bottom passage 24 are arranged such that an angle θ between a center line x1 passing through the center of the installation hole 8 and a center line x2 passing through a center of the first bottom passage 24 is not larger than 90°.

As a result, it is possible to shorten the second bottom passage 25 that connects the installation hole 8 and the first bottom through-hole 24 and reduce a size of the thick portion 1d by simplifying the shape of the thick portion 1d. Furthermore, since the installation hole 8 is arranged near the other end of the first bottom through-hole 24 (an end opposite to the end of the bottom chamber 22 side), it is possible to improve work efficiency when the damping valve V1 and the connecting member 7 are installed in the outer tube 1.

It is noted that the angle θ between the center line x1 of the installation hole 8 and the center line x2 of the first bottom through-hole 24 may appropriately change without limiting to that described above. In addition, according to this embodiment, as illustrated in FIG. 1, the connecting port of the hose H of the jack mechanism J is arranged to directly underlie the installation hole 8, and the installation position of the damping valve V1, the installation position of the connecting member 7, and the installation position of the hose H are near each other. Therefore, it is possible to improve work efficiency in the installation work of such components.

Figure 4:
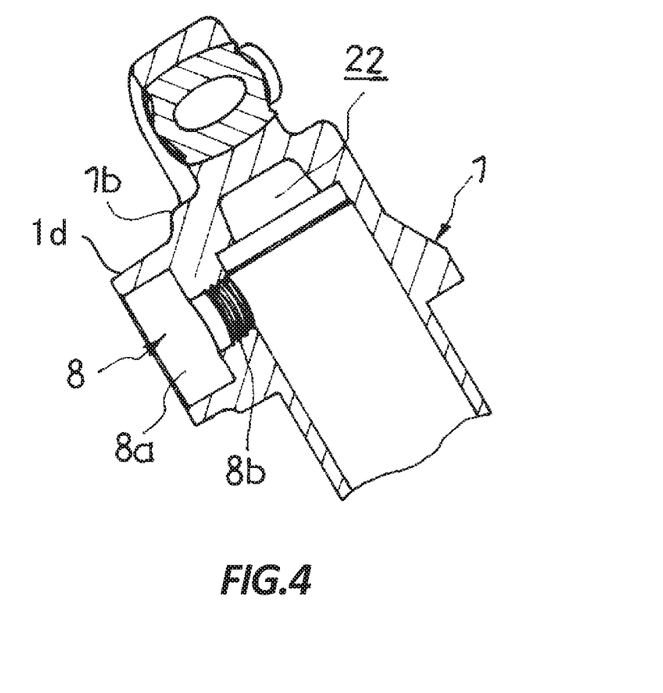
FIG. 4 is a cross-sectional view taken along a line IV-IV of FIG. 2.
Figure 6:
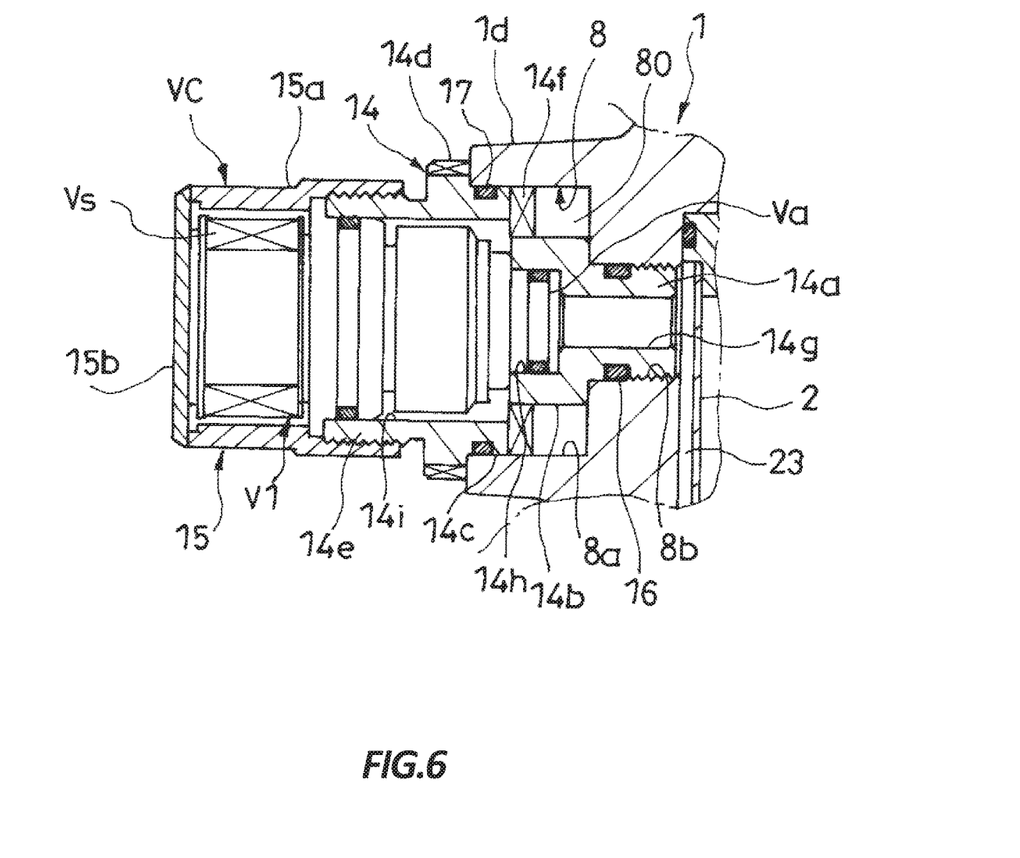
FIG. 6 is a diagram illustrating a damping valve as seen in the cross-sectional view taken along a line VI-VI of FIG. 5.

As illustrated in FIGS. 3, 4, and 6, the installation hole 8 includes an insertion hole 8a having a large diameter facing the outside of the outer tube 1 and a threaded bore 8b having a small diameter passing through the outer tube 1 from the center of the insertion hole 8a towards the cylindrical gap 23. Female threading is performed for the inner circumferential surface of the threaded bore 8b in the cylindrical gap 23 side.

The damping valve V1 is housed in a valve casing VC. The damping valve V1 and the valve casing VC are integrated with each other to constitute a valve assembly. The valve casing VC includes a tubular casing member 14 connected to the outer tube 1 and a cap member 15 having a bottomed tubular shape to cap an external opening of the casing member 14.

The casing member 14 having a cylindrical shape as described above includes a thread portion 14a, a middle diameter portion 14b, a large diameter portion 14c, a flange portion 14d, and a sleeve 14e provided coaxially and sequentially from the cylinder 2 side.

The outer circumferential surface of the leading end portion of the thread portion 14a is subjected to male threading and is screwed to the threaded bore 8b of the installation hole 8. The middle diameter portion 14b has an outer diameter larger than that of the thread portion 14a or the threaded bore 8b and smaller than that of the insertion hole 8a so that an annular passage 80 where the working oil can move is formed in the outer circumference of the middle diameter portion 14b.

An annular seal ring 16 is installed in a base end portion of the thread portion 14a so that it is difficult to move the working oil between the annular passage 80 and the cylindrical gap 23 without passing through the damping valve V1.

The large diameter portion 14c has an outer diameter larger than that of the middle diameter portion 14b and is inserted into the insertion hole 8a. An annular seal ring 17 is installed in the outer circumference of the large diameter portion 14c. The large diameter portion 14c closes the opening of the external air side of the installation hole 8 to prevent the working oil of the installation hole 8 from leaking to the outside.

A plurality of notches 14f are provided in the right end of the large diameter portion 14c in FIG. 6 along a circumferential direction. As a result, the inside of the casing member 14 and the annular passage 80 communicate with each other.

The flange portion 14d has an outer diameter larger than that of the large diameter portion 14c or the insertion hole 8a and abuts on the left-side surface of the thick portion 1d in FIG. 6. The outer circumferential surface of the sleeve 14e is subjected to male threading.

The casing member 14 includes an inlet hole 14g that is formed in an approximate center of the axial direction to extend from the thread portion 14a to the middle diameter portion 14b and is opened to the cylindrical gap 23, a holding hole 14h that has a diameter larger than that of the inlet hole 14g and is formed continuous to the inlet hole 14g to extend from the middle diameter portion 14b to the large diameter portion 14c, and a retaining hole 14i that has a diameter larger than that of the holding hole 14h, is formed continuous to the holding hole 14h to extend from the large diameter portion 14c to the sleeve 14e and is opened to the outside. In addition, the retaining hole 14i communicates with the annular passage 80 via the notches 14f, and the annular passage 80 communicates with the other end 25b of the second bottom passage 25 (refer to FIG. 3).

The cap member 15 includes a tubular portion 15a subjected to female threading on the inner circumferential surface of the leading end portion and a bottom portion 15b that closes the left opening of the tubular portion 15a in FIG. 6. The bottom portion 15b is caulked and fixed to the left end of the tubular portion 15a in FIG. 6.

The leading end portion Va of the damping valve V1 is fitted to the holding hole 14h so that the working oil flowing to the inside of the casing member 14 from the inlet hole 14g passes through the damping valve V1, flows to the inside of the retaining hole 14i, and is discharged to the reservoir R via the notches 14f, the annular passage 80, and the second bottom passage 25. The damping valve V1 is configured to resist a flow of this working oil. It is noted that the damping valve V1 may have any configuration without a limitation, and will not be described in detail herein.

According to this embodiment, the damping valve V1 has a solenoid Vs. Therefore, the resistance to the flow of the working oil can change by adjusting an electric current supply amount to the solenoid Vs. The configuration of the damping valve V1 may change appropriately. For example, the resistance to the flow of the working oil may be adjusted manually using an adjuster or the like.

Next, a description will be made for operations of the shock absorber 100.

During the expansion operation of the shock absorber 100 in which the piston rod 3 retreats from the cylinder 2, the working oil of the contracting rod-side chamber 20 moves to the reservoir R via the discharge passage L1. In addition, the working oil corresponding to the volume of the piston rod 3 retreating from the cylinder 2 moves to the expanding piston-side chamber 21 via the connecting member 7, the first bottom passage 24, the bottom chamber 22, and the absorption passage 5a. Therefore, in the reservoir R, the fluid retaining chamber 61 contracts while the gas chamber 62 expands.

During the contraction operation of the shock absorber 100 in which the piston rod 3 enters the cylinder 2, the working oil of the contracting piston-side chamber 21 moves to the expanding rod-side chamber 20 via the piston passage 4a. In addition, the working oil corresponding to the volume of the piston rod 3 entering the cylinder 2 moves to the reservoir R via the discharge passage L1. Therefore, in the reservoir R, the fluid retaining chamber 61 expands while the gas chamber 62 contracts.

That is, the shock absorber 100 is operated as a uni-flow type in which the working oil circulates in a uni-directional manner via the piston-side chamber 21, the rod-side chamber 20, and the reservoir R in either the expansion or contraction operation. In addition, in either the expansion or contraction operation, the working oil inside the cylinder 2 is discharged to the reservoir R via the discharge passage L1 sequentially in the order of the through-hole 2a of the cylinder 2, the cylindrical gap 23, the inlet hole 14g, the retaining hole 14i, the notches 14f, the annular passage 80, the second bottom passage 25, the first bottom passage 24, and the connecting member 7. Therefore, in either the expansion or contraction operation, the shock absorber D generates a damping force caused by the resistance of the damping valve V1 provided in the middle of the discharge passage L1. In addition, according to this embodiment, the damping force can be controlled by changing the resistance of the damping valve V1 using the solenoid Vs.

It is noted that, by setting the cross-sectional area of the piston rod 3 to a half of the cross-sectional area of the piston 4, it is possible to equalize the amount of the working oil discharged from the cylinder 2 in both the expansion and contraction operations under the same pitch. Therefore, if the resistance of the damping valve V1 is set to be the same, it is possible to set the same damping force for both the expansion and contraction operations.

Next, a description will be made for the effects of the shock absorber 100 according to this embodiment.

In the shock absorber 100, the partitioning wall member 60 is provided inside the vessel 6. The partitioning wall member 60 partitions the reservoir R into the fluid retaining chamber 61 filled with the working oil and the gas chamber 62 encapsulated with the compressed gas. In addition, the partitioning wall member 60 is set to change the volume ratio between the fluid retaining chamber 61 and the gas chamber 62.

As a result, it is possible to compress the working oil using the gas encapsulated in the gas chamber 62 and improve responsiveness for generating the damping force. Although the partitioning wall member 60 according to this embodiment is a bladder, it may change appropriately. The partitioning wall member 60 may be, for example, a free piston or a bellows.

According to this embodiment, the angle θ between the center line x1 of the installation hole 8 and the center line x2 of the first bottom passage 24 is set to 90° or smaller.

When a cavity such as a passage or an installation hole is formed in the outer tube 1, it is necessary to provide a thick portion 1d along the cavity in order to obtain a sufficient strength. For this reason, if the installation hole 8, the first bottom passage 24, and the second bottom passage 25 are separated, or the holes or the passages are lengthened, the shape of the thick portion 1d may become complicated, or the range for providing the thick portion 1d becomes widened. In this case, the amount of the material for forming the outer tube 1 increases, and this also increases cost.

In comparison, in the configuration described above, it is possible to dispose the installation hole 8 and the first bottom passage 24 near each other and shorten the second bottom passage 25. As a result, it is possible to simplify the shape of the thick portion 1d. In addition, it is possible to reduce the size of the thick portion 1d. Accordingly, it is possible to reduce the amount of the material for forming the outer tube 1 and suppress cost.

In the configuration described above, since the installation position of the damping valve V1 and the installation position of the connecting member 7 are near each other, it is possible to further improve work efficiency when the damping valve V1 or the connecting member 7 is installed in the outer tube 1.

According to this embodiment, the installation hole 8 is formed perpendicularly to the axial center line of the tubular portion 1a of the outer tube 1. The installation hole 8 includes the insertion hole 8a opened to the outside of the outer tube 1 and the threaded bore 8b formed to have a diameter smaller than that of the insertion hole 8a and pass through the outer tube 1 from the center of the insertion hole 8a to the cylindrical gap 23.

The valve casing VC includes the casing member 14 formed in a cylindrical shape and connected to the outer tube 1, and the cap member 15 formed in the bottomed tubular shape to close the opening in the side of the casing member 14 opposite to the outer tube 1.

The casing member 14 includes the thread portion 14a screwed to the threaded bore 8b, the middle diameter portion 14b formed to have a diameter larger than that of the thread portion 14a and smaller than that of the insertion hole 8a and provided with an annular passage 80 in the outer circumference, the large diameter portion 14c formed continuous to the side of the middle diameter portion 14b opposite to the thread portion to close the opening of the installation hole 8, and the notches 14f that cause the inside of the casing member 14 and the annular passage 80 to communicate with each other. In addition, one end 25a of the second bottom passage 25 communicates with the annular passage 80.

In this configuration, the working oil of the cylindrical gap 23 can flow from the thread portion 14a of the casing member 14 to the inside of the valve casing VC, pass through the damping valve V1, flow from the notches 14f to the annular passage 80 of the external side of the valve casing VC, and move from the second bottom passage 25 to the reservoir R.

Since the annular passage 80 is provided in the installation hole 8 using the valve casing VC to cause the second bottom passage 25 to communicate with the annular passage 80, it is possible to relatively freely select the connection position between the second bottom passage 25 and the installation hole 8. Therefore, it is possible to facilitate design of the second bottom passage 25.

The shock absorber 100 according to this embodiment includes the valve casing VC for housing the damping valve V1, and the installation hole 8 of the outer tube 1 has the threaded bore 8a where the valve casing VC is screwed. In addition, the damping valve V1 is installed in the installation hole 8 using the valve casing VC.

In this configuration, it is possible to provide the threaded bore 8b in the outer tube 1 using a tap and screw the valve casing VC to the threaded bore 8b. Therefore, it is possible to remarkably simplify the installation work of the damping valve V1.

It is possible to appropriately change the method of installing the damping valve V1. For example, the outer tube 1 may be chucked using a dedicated tool, male threading may be performed for the outer circumferential surface of the thick portion 1d of the outer tube 1 using a turner machine, and then, the cap member 15 may be directly screwed to the thick portion 1d. However, when a dimensional tolerance of the outer tube 1 is large, for example, when the outer tube 1 is formed through casting or the like, it is difficult to chuck the outer tube 1 using a dedicated tool and perform male threading for the thick portion 1d of the outer tube 1. In comparison, when the threaded bore 8b is formed using a tap, the fabrication becomes easy regardless of the dimensional tolerance of the outer tube 1. Therefore, using the configuration described above, it is possible to remarkably simplify the installation of the damping valve V1 and remove a limitation in the method of fabricating the outer tube 1.

The shock absorber 100 according to this embodiment is a uni-flow type shock absorber and includes the vessel 6 externally mounted to the outer tube 1 and internally provided with the reservoir R, the connecting member 7 that connects the vessel 6 and the outer tube 1, the cylindrical gap 23 provided between the outer tube 1 and the cylinder 2, the installation hole 8 provided in the outer tube 1 and opened to the cylindrical gap 23 to allow the damping valve V1 to be installed, the first bottom passage 24 having one end communicating with the bottom chamber 22 and the other end connected to one end of the connecting member 7, and the second bottom passage 25 having one end 25a communicating with the installation hole 8 and the other end 25b communicating with the middle of the first bottom passage 24. In addition, the discharge passage L1 communicates with the reservoir R via the cylindrical gap 23, the installation hole 8, the second bottom passage 25, the first bottom passage 24, and the connecting member 7.

In this configuration, even when the shock absorber 100 is a uni-flow type, it is possible to provide the shock absorber 100 having a twin-tube structure by externally mounting the vessel 6 internally provided with the reservoir R to the outer tube 1. Therefore, it is possible to simplify the structure of the shock absorber 100.

Furthermore, in this configuration, even when the vessel 6 is externally mounted to the outer tube 1 in the uni-flow type shock absorber 100, the passage (second bottom passage 25) for causing the cylindrical gap 23 and the reservoir R to communicate with each other is connected to the middle of the passage (first bottom passage 24) for causing the bottom chamber 22 and the reservoir R to communicate with each other. Therefore, it is possible to simplify the structure of the passage provided in the outer tube 1.

Embodiments of this invention were described above, but the above embodiments are merely examples of applications of this invention, and the technical scope of this invention is not limited to the specific constitutions of the above embodiments.

With respect to the above description, the contents of application No. 2013-263150, with a filing date of Dec. 20, 2013 in Japan, are incorporated herein by reference.

The invention claimed is:

1. A shock absorber comprising:
an outer tube that has a bottomed tubular shape;
a tubular cylinder provided in an axial center portion of the outer tube in an upright manner;
a piston rod that accesses the cylinder;
a piston held by a leading end portion of the piston rod and inserted into the cylinder movably along an axial direction;
a base member fixed to a side of the cylinder opposite to the piston rod;
a rod-side chamber and a piston-side chamber partitioned by the piston inside the cylinder and filled with a hydraulic fluid;
a bottom chamber provided between a bottom portion of the outer tube and the base member and filled with the hydraulic fluid;
a vessel externally mounted to the outer tube;
a reservoir provided inside the vessel, the reservoir communicating with the bottom chamber and storing the hydraulic fluid;
a piston passage that allows only for a flow of the hydraulic fluid directed from the piston-side chamber to the rod-side chamber;
an absorption passage that allows only for a flow of the hydraulic fluid directed from the bottom chamber to the piston-side chamber;
a discharge passage that allows the rod-side chamber to communicate with the reservoir; and
a damping valve provided in a middle of the discharge passage,
wherein the discharge passage has
a connecting member that connects the vessel and the outer tube,
a cylindrical gap provided between the outer tube and the cylinder,
an installation hole provided in the outer tube and opened to the cylindrical gap,
a first bottom passage that has one end communicating with the bottom chamber and the other end connected to one end of the connecting member, and
a second bottom passage that has one end communicating with the installation hole and the other end communicating with a middle of the first bottom passage, and
the damping valve is installed in the installation hole.

2. The shock absorber according to claim 1, further comprising a valve casing that houses the damping valve,
wherein the installation hole has a threaded bore where the valve casing is screwed, and
the damping valve is installed in the installation hole via the valve casing.

3. The shock absorber according to claim 2, wherein the installation hole has
an insertion hole provided perpendicularly to an axial center line of the tubular portion of the outer tube and opened to the outside of the outer tube, and
the threaded bore that has a diameter smaller than that of the insertion hole and passes through the outer tube from a center of the insertion hole to the cylindrical gap,
the valve casing has
a casing member formed in a cylindrical shape and connected to the outer tube, and a cap member formed in a bottomed tubular shape, the cap member closing an opening of the casing member opposite to the outer tube, the casing member has a thread portion screwed to the threaded bore, a middle diameter portion formed to have a diameter larger than that of the thread portion and smaller than that of the insertion hole, the middle diameter portion forming an annular passage in an outer circumference, a large diameter portion formed continuous to a side of the middle diameter portion opposite to the thread portion, the large diameter portion closing an opening of the installation hole, and a notch that allows the inside of the casing member to communicate with the annular passage, and the one end of the second bottom passage communicates with the annular passage.

4. The shock absorber according to claim 1, wherein an angle between a center line of the installation hole and a center line of the first bottom passage is set to 90° or smaller.

5. The shock absorber according to claim 1, further comprising a partitioning wall member provided in the vessel, the partitioning wall member partitioning the reservoir into a fluid retaining chamber filled with a hydraulic fluid and a gas chamber encapsulated with a compressed gas and being configured to change a volume ratio between the fluid retaining chamber and the gas chamber.

* * * * *